3,019,258
ORGANIC FLUORINE COMPOUNDS
Murray Hauptschein, Glenside, and Milton Braid, Philadelphia, Pa., and Francis E. Lawlor, Wilmington, Calif., assignors to Pennsalt Chemicals Corporation, Philadelphia, Pa., a corporation of Pennsylvania
No Drawing. Filed Dec. 30, 1958, Ser. No. 783,662
3 Claims. (Cl. 260—543)

This invention relates to new fluorine-containing sulfenyl chlorides.

The desirability of introducing fluorine into organic compounds has been recognized. In general, the presence of fluorine gives much greater chemical and thermal stability than would be present in analogous compounds not containing fluorine. Such properties are highly desirable in many industrial applications; as, for example, in high pressure lubricants.

In accordance with the invention it has been found that certain branched-chain fluorine containing polysulfides can be reacted with chlorine to give fluorine-containing sulfenyl chlorides which are useful as additives for high pressure gear lubricants, cutting oils, fungicides and the like. The novel fluorinated branched-chain sulfenyl chlorides of the invention have the general formula:

$$R(CF_2CFZ)_nSCl$$

where R is selected from the class consisting of chlorine, fluorine, perfluoroalkyl and perfluorochloroalkyl groups preferably having not more than about 6 carbon atoms; where Z is selected from the class consisting of perfluoroalkyl and perfluorochloroalkyl groups preferably having not more than about 3 carbon atoms; and where $n$ is an integer from 1 to about 10.

A "perfluoroalkyl" group means a substituted alkyl group containing only fluorine and carbon.

A "perfluorochloroalkyl" group means a substituted alkyl group containing only fluorine, chlorine and carbon.

In accordance with the invention the above sulfenyl chlorides are prepared by reacting chlorine with polysulfides of the type:

$$R(CF_2CFZ)_n-S_x-(CFZCF_2)_nR$$

where R, Z and $n$ are as defined above and where $x$ is an integer having a value in the range of from 2 to 5. The reaction between the polysulfide and chlorine is preferably conducted at temperatures between 20° C. and 250° C., usually between about 50° C. and about 150° C. Pressure is not critical and will normally be from atmospheric to about 10,000 lbs./in.² gage. Reaction time is not critical and may range from e.g. 10 minutes to several days. Chlorine should be present in proportions ranging from about 1 to 10 moles (Cl₂) per mole of polysulfide The particular manipulation technique by means of which the reaction is carried out is not important. Conveniently, the polysulfide is put into a pressure vessel with the required amount of chlorine and heated to reaction temperature. Alternately, the reaction can be carried out by passing the chlorine and polysulfide through a hot tube.

Typical examples of fluorinated sulfenyl chlorides of the invention are:

$C_4F_9CF(CF_3)SCl$
$C_3F_7[CF_2CF(CF_3)]_5SCl$
$CF_2ClCF(CF_3)[CF_2CF(CF_3)]_2SCl$
$CF_3[CF_2CF(CF_2Cl)]_2SCl$
$CF_2ClCFCl[CF_2CF(CF_3)]_4SCl$
$CFCl_2CF_2[CF_2CF(CFCl_2)]SCl$
$C_3F_7[CF_2CF(CF_3)]_{8\ av.}SCl*$
$C_2F_5[CF_2CF(CF_3)]_{6\ av.}SCl*$

* A mixture of compounds in which the average (av.) number of repeating [CF₂CF(CF₃)] units in the chain is 8 and 6 respectively.

The preparation of the polysulfide starting materials is described in co-pending application Serial No. 646,202, filed March 15, 1957, of Murray Hauptschein et al., now Patent No. 2,914,566. As described in that application, the polysulfides used as starting materials in the present invention are prepared by reacting secondary fluorinated iodides of the formula $R(CF_2CFZ)_nI$, where R, Z and $n$ are as defined above, with sulfur.

Among the secondary iodides that may be reacted with sulfur to prepare the polysulfide starting materials, the following may be cited as exemplary:

$C_3F_7[CF_2CF(CF_3)]I$
$C_3F_7[CF_2CF(CF_3)]_3I$
$CF_2CFClCF(CF_3)[CF_2CF(CF_3)]I$
$CF_2CFClCF(CF_3)[CF_2CF(CF_2Cl)]_2I$
$CF_2ClCF(CF_3)[CF_2CF(CF_2Cl)]_2I$
$CF_2Br[CF_2CF(CF_3)]_2I$
$CF_3[CF_2CF(CF_2Cl)]I$
$C_3F_7[CF_2CF(CF_3)]_{10}I$ and $CF_2ClCF(CF_3)[CF_2CF(CF_3)]_{10}I$ The reaction between the iodide and sulfur is, in general, conducted at a temperature between about 150° C. and 300° C., preferably between about 160° C. and 200° C. Pressure is not a critical factor. In general it will be between atmospheric and about 10,000 lbs./in.² gage. Time of reaction is likewise not critical and may be from a matter of say 10 minutes to several days. The proportion of sulfur used will depend to some extent upon the amount of sulfur it is desired to have in the final product. Generally between 2 and 20 moles of sulfur (S) will be present, per mole of iodide.

In carrying out the reaction between sulfur and the iodide to provide the polysulfides starting materials, any suitable technique may be employed. Conveniently, the ingredients are simply put in a suitable vessel, such as a stainless steel or Monel metal autoclave or a glass vessel, in an inert atmosphere, and heated to the required temperature with stirring. In certain cases, particularly when the secondary iodide is a solid it may be desirable to use an inert solvent, such as a fluorochloroalkane as the reaction medium. Alternatively, the reaction may be carried out by passing the reactants through a heated tube.

The invention will be further described with reference to the following examples, it being understood that these examples are given only for the purpose of illustration and are not to be taken as in any way limiting the invention beyond the scope of the appended claims. Examples I to IV illustrate the preparation of the polysulfides starting materials, while Examples V to VII illustrate the preparation of the sulfenyl chlorides of the invention by chlorination of the polysulfides.

EXAMPLE I

*The reaction of 2-iodoperfluorohexane with sulfur*

Forty-eight grams (0.108 mole) of 2-iodoperfluorohexane and 33.5 g. of sublimed sulfur were charged into a 300 ml. Monel autoclave under a dry nitrogen atmosphere. The sealed autoclave was heated in a shaker at 172°–176° C. for 112 hours. The autoclave was cooled to room temperature and vented in vacuo to a Dry Ice-cooled trap. No volatile material was collected in this trap. From the autoclave was drained an oil shown to be $[C_4F_9CF(CF_3)]_2S_x$, red in color due to a small amount of dissolved iodine, boiling point 87° C. (8 mm.)–ca. 103° C. (0.1 mm.). Only 0.9 g. (0.003 mole) of 2-iodoperfluorohexane was recovered, and 41 g. of a hard "stick" of a mixture of sulfur and iodine was collected.

Careful rectification of the 30 g. of crude oil collected gave the pure compounds shown in the table below.

Based on the determined average value of 3 for $x$ in $[C_4F_9CF(CF_3)]_2S_x$, the conversion was 76% and the yield was 78%.

PERFLUORO-2-HEXYL POLYSULFIDES

| $[C_4F_9CF(CF_3)]_2S_x$ $x$ value | B.P. | | $n_D^t$ | $t$, °C. | Analysis, Percent | | | |
|---|---|---|---|---|---|---|---|---|
| | | | | | Carbon | | Sulfur | |
| | °C. | Mm. | | | Calc. | Found | Calc. | Found |
| 2 | 94 | 8 | 1.3300 | 23 | 20.5 | 20.4 | 9.1 | 9.6* |
| 3 | 66 | <0.1 | 1.3469 | 28.8 | 19.6 | 19.5 | 13.1 | 12. |
| 4 | ca. 80 | <0.1 | 1.3791 | 20 | 18.8 | 19.2 | 16.7 | 16.7 |
| 5 | Residue (viscous oil) | | 1.3975 | 19.5 | 18.1 | 18.0 | 20.1 | 19.6 |

*Analysis—Calcd. for $C_{12}F_{26}S_2$: F, 70.34. Found: 70.7.

EXAMPLE II

The procedure of Example I was repeated in a sealed Pyrex tube at 180° C. for 75 hours with similar results.

EXAMPLE III

*The reaction of $C_3F_7[CF_2CF(CF_3)]_nI$ with sulfur*

By a procedure similar to Example I, the products $$C_3F_7[CF_2CF(CF_3)]_n\text{—}S_x\text{—}[CF(CF_3)CF_2]_nC_3F_7$$

where $n=2\text{-}5$ and $x=2\text{-}5$ are formed from the corresponding telomer iodides, $C_3F_7[CF_2CF(CF_3)]_nI$ where $n=2\text{-}5$.

The compound where $n=2$ and $x=2.5$ average is an oily material which is useful for lubricating the bearings of laboratory stirring apparatus.

EXAMPLE IV

The compounds $CF_2ClCF(CF_3)[CF_2CF(CF_3)]_{1-5}I$ are heated at 180° F. with a 10 molar excess of sulfur, using the general technique of Example I. Products having the formula $$CF_2ClCF(CF_3)[CF_2CF(CF_3)]_{1-5}S_{2-5}[(CF_3)CFCF_2]_{1-5}(CF_3)CFCF_2Cl$$

are obtained.

EXAMPLE V

In a heavy-wall Pyrex ampule (volume 70 cc.), a mixture of 4.2 g. (0.059 mole) of chlorine and 8 g. (0.011 mole) of perfluoro-2-hexyl polysulfide $$[C_4F_9CF(CF_3)]_2S_x$$

where $x=2.5$ av. was sealed and heated for 125 hours at 105° C. The tube was cooled and opened, and then warmed to room temperature to remove unreacted chlorine. The remaining mixture was carefully fractionated. A total of 6.6 g. (0.017 mole) of perfluoro-2-hexylsulfenyl chloride, $C_4F_9CF(CF_3)SCl$, a pale yellow liquid, was obtained; middle cut, boiling point 63–63.8° C. at 97 mm., $n_D^{26}$ 1.3237. *Analysis.*—Calcd. for $C_6ClF_{13}S$: C, 18.6; Cl, 9.2. Found: C, 18.8; Cl, 8.9. The compound had ultraviolet absorption maxima (in isooctane) at 213.5 mµ (strong) and at 340 mµ (weak). Further distillation effected the recovery of 1.1 g. of unreacted polysulfide. The conversion to the sulfenyl chloride was 77% and the yield was 89% of theory.

EXAMPLE VI

Following the procedure of Example V, the compound $C_3F_7[CF_2CF(CF_3)]_5S_{2.5\text{ av.}}[(CF_3)CFCF_2]_5C_3F_7$ is reacted with four times the stoichiometric amount of chlorine to give the compound $C_3F_7[CF_2CF(CF_3)]_5SCl$. A mixture of this compound and the product of Example III (where $n=2$ and $x=2.5$ av.) is useful for lubricating the bearings of laboratory stirring apparatus.

EXAMPLE VII

Following the procedure of Example V, $$CF_2ClCF(CF_3)[CF_2CF(CF_3)]_2\text{—}S\text{—}S\text{—}[(CF_3)CFCF_2]_2(CF_3)CFCF_2Cl$$

is reacted with a 5 molar excess of chlorine ($CL_2$) at 120° C. for two hours to give $$CF_2ClCF(CF_3)[CF_2CF(CF_3)]_2SCl$$

The sulfenyl chlorides of the invention, as exemplified by the products of Example V through VII, are useful as additives in extreme pressure lubricants where they act as antiwear additives. For example, they may be added in amounts of e.g. 1 to 10% to a base stock consisting of a solvent refined parafinic oil such as an oil of this type having a viscosity of 500 Saybolt Universal seconds at 100° F., to provide a lubricant e.g. for hypoid gears. The sulfenyl chlorides of the of the invention may also be used as additives to cutting oils in amounts e.g. from 1 to 10%, such for example as a naphthenic base cutting oil containing minor amounts (e.g. 1½%) of sulfur, such as coastal oil of this type having a viscosity of 60 Saybolt Universal seconds at 100° F.

The sulfenyl chlorides may also be added to the fluorine containing polysulfides described in co-pending application Serial No. 646,202 to provide extreme pressure lubricants and cutting oils of superior properties. The sulfenyl chlorides of the invention likewise have fungicidal properties.

This application is a continuation-in-part of our co-pending application Serial No. 646,202, filed March 15, 1957, now Patent No. 2,914,566.

We claim:
1. Compounds having the general formula

$$R[CF_2CFZ]_nSCl$$

where R is selected from the class consisting of perfluoroalkyl and perfluorochloroalkyl groups having from 1 to 6 carbon atoms; where Z is selected from the class consisting of $CF_3$ and $CF_2Cl$ radicals; and where $n$ is an integer from 1 to about 10.

2. Compounds having the formula $$C_3F_7[CF_2CF(CF_3)]_nSCl$$

where $n$ is an integer from 1 to about 10.

3. Compounds having the formula $$CF_2CFClCF(CF_3)[CF_2CF(CF_3)]_nSCl$$

where $n$ is an integer from 1 to about 10.

References Cited in the file of this patent

UNITED STATES PATENTS 2,807,615    Himel _____ Sept. 24, 1957

OTHER REFERENCES

Knunyants et al.: Chem. Abstracts, vol. 50, col. 7069 (1956).

UNITED STATES PATENT OFFICE
CERTIFICATE OF CORRECTION

Patent No. 3,019,258            January 30, 1962

Murray Hauptschein et al.

It is hereby certified that error appears in the above numbered patent requiring correction and that the said Letters Patent should read as corrected below.

Column 2, lines 14 and 15, strike out $$CF_2CFClCF(CF_3)[CF_2CF(CF_3)]I$$
$$CF_2CFClCF(CF_3)[CF_2CF(CF_2Cl)]_2I$$

and insert instead the following:

$$CF_2ClCF(CF_3)[CF_2CF(CF_3)]I$$

column 3, in the table, under "Found", line 2 thereof, for "12." read -- 12.8 --; column 4, line 65, for $$CF_2CFClCF(CF_3)[CF_2CF(CF_3)]_nSCl$$

read $$CF_2ClCF(CF_3)[CF_2CF(CF_3)]_nSCl$$

Signed and sealed this 3rd day of July 1962.

(SEAL)
Attest:
ERNEST W. SWIDER
Attesting Officer

DAVID L. LADD
Commissioner of Patents